United States Patent [19]

Kessler

[11] Patent Number: 4,518,823
[45] Date of Patent: May 21, 1985

[54] MODEM CARTRIDGE AND CONNECTION FOR PROGRAM CARTRIDGE TYPE COMPUTERS

[75] Inventor: Bayard F. Kessler, Woodland Hills, Calif.

[73] Assignee: Novation, Inc., Chatsworth, Calif.

[21] Appl. No.: 539,648

[22] Filed: Oct. 6, 1983

[51] Int. Cl.³ .............................................. H04L 5/00
[52] U.S. Cl. .................................. 179/2 DP; 179/2 C; 375/8
[58] Field of Search ................ 179/2 C, 2 DP; 375/8; 364/708, 709, 710

[56] References Cited

U.S. PATENT DOCUMENTS

| | | | |
|---|---|---|---|
| 4,149,027 | 4/1979 | Asher et al. | |
| 4,259,668 | 3/1981 | Nishimura et al. | |
| 4,323,979 | 4/1982 | Johnston | 364/708 |
| 4,367,374 | 1/1983 | Serrano | 179/2 DP |

FOREIGN PATENT DOCUMENTS 2061672  5/1981  United Kingdom ............... 179/2 C Primary Examiner—Keith E. George
Attorney, Agent, or Firm—Blakely, Sokoloff, Taylor & Zafman

[57] ABSTRACT

Modem cartridges and connection for program cartridge type computers are disclosed whereby a modem cartridge may be used in place of a program cartridge to provide the modem function between the computer and a telephone line. The modem cartridge is constructed to be interchangeable with an ordinary program cartridge whereby the modem may be electrically connected to the computer bus in the same manner as the read-only memory in a conventional program cartridge. The modem cartridge however, is provided with additional connection points which are accessible when the cartridge is in place in the computer to provide connection to a conventional phone line modular connector. The connection between the modem cartridge and the modular phone line connector may be provided by cooperatively disposed wiper-type contacts operative between the modem cartridge and contacts supported on the computer chassis positioned so as to not interfere with conventional program cartridges, with further connection being made between the contacts supported on the computer chassis and the modular phone line connector being made in computers having the manually operable cover over the program cartridge region by a thin, flat cable extending out from under the cover. Operating software or firmware for the modem may be contained in the modem cartridge or separately loaded into the computer from tape or disk.

12 Claims, 10 Drawing Figures

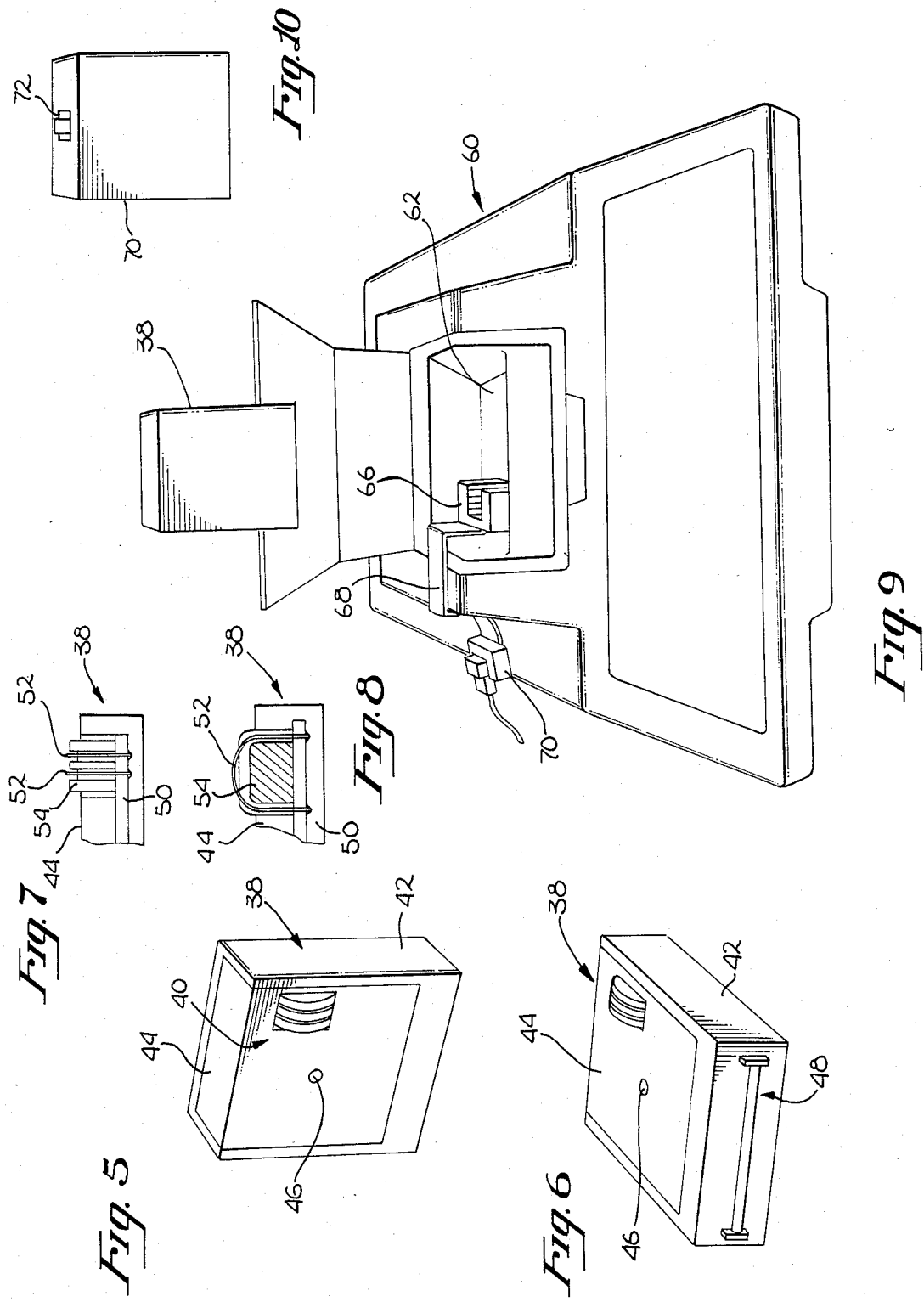

MODEM CARTRIDGE AND CONNECTION FOR PROGRAM CARTRIDGE TYPE COMPUTERS

BACKGROUND OF THE INVENTION

1. Field of the Invention

The present invention relates to the field of microcomputers, and more particularly to modulator/demodulator sets for data communication over phone lines between computers.

2. Prior Art

Microcomputer systems of various configurations for personal use and entertainment have been sold in large quantities over the past few years. Some of these computer systems such as the Atari 400 and 800 computers, manufactured by Atari, Inc., have program cartridge receptacles whereby, when a program cartridge is plugged there into, the read-only memory in the program cartridge is connected to the computer system address and data busses, power, ground and synchronized timing and control signals. In the computers just mentioned, there is a shielding cover which closes over the program cartridges, with a lock-out which prevents operation of the computer with the cover open. The computers of course also have other connection capabilities such as, by way of example, cassette recorder input and output connections, game paddle connections, etc.

Computers of the foregoing type are relatively inexpensive and provide substantial computing and gameplaying capabilities for their cost. Also their capabilities may be extended by using various peripheral devices therewith such as, by way of example, a modem for data communication over a phone line. Modems could be connected to such machines either by opening the computer case to make direct connections to the PC board, or by providing the modem as a more conventional free-standing device and coupling the modem to the computer through PC board connections provided at the back of the computer. However, opening the computer case to connect modem board to the computer board is quite unattractive, as such computers are generally consumer items and such installation would be beyond the capabilities of most consumers. On the other hand a free-standing modem, while being attractive as being readily user connectable, has certain unattractive aspects such as requiring separate free-standing enclosure, relatively expensive connectors, cabling, etc. In that regard, the cost of accessory or peripheral equipment for computers of this general type is an extremely important consideration, as the computers themselves are relatively reasonably priced and all but the lowest cost accessory or peripheral equipment would be out of proportion to the price of the computers themselves. Accordingly, the purpose of the present invention is to provide a modem and a means for connecting the modem to a computer of the foregoing type at the lowest possible cost which is readily user installable.

BRIEF SUMMARY OF THE INVENTION

Modem cartridges and connection for program cartridge type computers are disclosed whereby a modem cartridge may be used in place of a program cartridge to provide the modem function between the computer and a telephone line. The modem cartridge is constructed to be interchangeable with an ordinary program cartridge whereby the modem may be electrically connected to the computer bus in the same manner as the read-only memory in a conventional program cartridge. The modem cartridge however, is provided with additional connection points which are accessible when the cartridge is in place in the computer to provide connection to a conventional phone line modular connector. The connection between the modem cartridge and the modular phone line connector may be provided by cooperatively disposed wiper-type contacts operative between the modem cartridge and contacts supported on the computer chassis positioned so as to not interfere with conventional program cartridges, with further connection being made between the contacts supported on the computer chassis and the modular phone line connector being made in computers having the manually operable cover over the program cartridge region by a thin, flat cable extending out from under the cover. Operating software or firmware for the modem may be contained in the modem cartridge or separately loaded into the computer from tape or disk.

BRIEF SUMMARY OF THE DRAWINGS

FIGS. 5 and 6 are perspective views of the modem cartridge of the present invention.

FIGS. 7 and 8 are partial cross sections of the modem cartridge of FIGS. 5 and 6, illustrating the spring contacts for completing the phone line connections to the modem cartridge.

FIG. 9 is a front view of an Atari 400 computer illustrating the mounting of the present invention therein.

FIG. 10 is a view of a modem cartridge coupleable directly to the modular plug of a telephone line or telephone handset line.

DETAILED DESCRIPTION OF THE INVENTION

Figure 1:
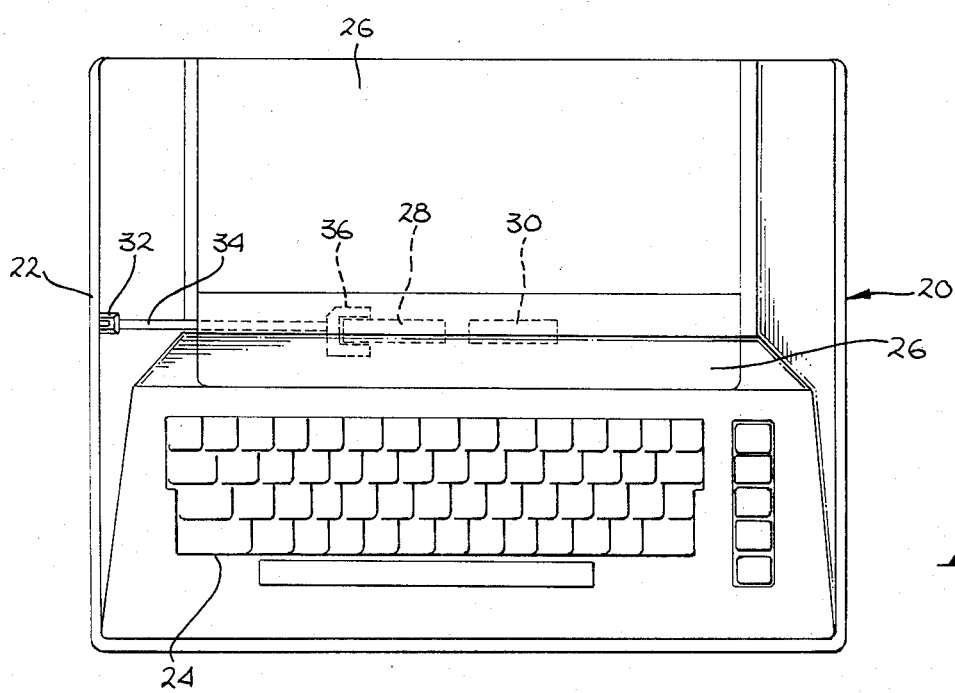
FIG. 1 is a top view of an Atari 800 computer with the present invention installed therein.

The preferred embodiment of the present invention will be described with respect to Atari computers, specifically the Atari 400 and 800 computers, as the preferred embodiment of the present invention is intended for use with such computers. Thus referring to FIG. 1, a top view of an Atari 800 computer, generally indicated by the numeral 20, may be seen. Like most personal computers, these computers are characterized by a case 22 having a keyboard 24 at the front thereof, with the case 22 having an enclosure for one or more printed circuit boards for the microprocessor, random access memory, read-only memory, certain interface circuits, etc., characteristic of typical computer systems. Also, not shown in FIG. 1, are connection sorts for connecting a tape recorder, game controllers and other devices to the computer.

The Atari 800 has a cover 26 comprising a substantial part of the top of case 22 aft of the keyboard 24, the cover 26 being hinged at the back thereof to open and provide access to a pair of receptacle-like slots 28 and 30 for receiving and making electrical connection with program cartridges made for that purpose. In particular a typical program cartridge for Atari computers is very roughly the size of a deck of cards, having a special self opening window-like region at one end thereof which, when opened, exposes the edge of a printed circuit board therein containing one or more read-only memories on which the program is stored. Each of the receptacles 28 and 30 in the computer are configured to automatically open the window in the end of the program cartridge upon insertion thereof, with an edge connector located at the bottom of each of the receptacles 28 and 30 mating with and making electrical connection to the edge of the printed circuit board in the program cartridge. The connection made to the program cartridge of course, provides direct communication capabilities between the cartridge and the microprocessor in the computer, as the proper operation of the system with the program cartridge in place requires the microprocessor to be able to access and read the data in the cartridge, i.e., the connection established between a program cartridge and the microprocessor is effectively a connection to the address and data busses of the microprocessor. As such the microprocessor in the computer could easily communicate with any other suitable device through one of the program cartridge ports 28 and 30. However the program cartridge receptacles are intended to receive self-contained cartridges in these computers, as the cover 26 has shielding fastened to the underside thereof which serves as part of the radiation shielding for the unit. As such a lock-out is provided in the computer so that the computer can be operated only when the cover 26 is closed Accordingly, any use of the program cartridge receptacles for purposes other than self-contained program cartridge must still allow the closing of the cover during operation.

Figure 4:
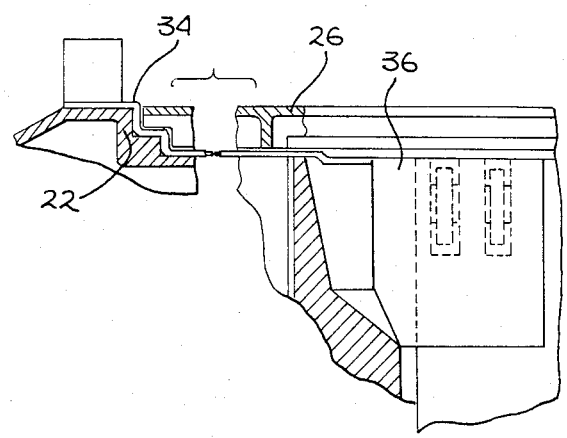
FIG. 4 is a partial cross section taken along line 4—4 of FIG. 2.

The present invention comprises a modem cartridge structure and connection means therefore which will allow the use of a modem cartridge in these computers in the same manner as prior art program cartridges to provide a modem connection between the computer and a telephone line. As may be seen in FIG. 1, a conventional phone line modular connector 32 is fastened to the computer case 22 and electrically connected through conductors 23 (FIG. 2) in a cable-like member 34 to an approximately C-shaped element 36 in one of the cartridge receptacles 28. The cable-like member 34 preferably is a strip of Mylar or Mylar-like material having conductive strips thereon applied by thick film printing techniques, the conductive strips being insulated on the second surface thereof by either an appropriate sprayed or printed-on insulative layer or by a second layer of Mylar. As such the entire cable thickness may be held to within only a few thousandths of an inch, and more particularly to a thickness which is equal to or less than the "fit" of the cover 26. Stated another way, the required shielding is readily achieved by the cover 26 without requiring or obtaining a precision fit of the cover due to an appropriate overlap in the shielding element. Accordingly, the normal clearance between the cover 26 and the case 22 when the cover is closed is adequate to accommodate the cable 34 therebetween. This is illustrated in FIG. 4 where it may be seen that the cable 34 extends along the surface of the case 22, passes under cover 26 and is connected to the C-shaped element 36. The cable 34 may be readily shaped and configured so as to lie flat against the adjoining portions of the computer and is preferably adhered to the computer surfaces by self-stick adhesive applied thereto and protected by an appropriate peal strip prior to installation. In that regard the modular connector 32 is also preferably adhered to the computer case by self stick adhesive so as to resist detachment as a result of inadvertent pulls on the telephone line, and for that purpose may be fastened to a larger plate or otherwise provided with a larger footprint for improved adhesion to the computer. The cementing of the cable 34 to the computer case provides good protection to the cable by preventing any opportunity or anything to catch under the cable and exert excessive forces thereon.

Now referring to FIGS. 5 through 8, details of the modem cartridge may be seen. The cartridge, generally indicated by the numeral 38, may be substantially identical to the standard Atari game cartridge with the exception of the provision for making electrical connection to a telephone line through the connection means generally indicated by the numeral 40. As with a conventional Atari program module, the module may be comprised of a module housing 42 and a cover 44 held on by a screw 46. Actually if desired, a standard Atari program cartridge housing and cover may be used, including the self-opening window generally indicated by the numeral 48.

A provision for making electrical connection to the telephone line generally indicated by the numeral 40 in FIGS. 5 and 6 is illustrated in detail in FIGS. 7 and 8, which are side and end cross sections of a small local region of the cartridge 38 respectively. In particular, a pair of U-shaped spring contacts 52 are soldered to the printed circuit board 50 in the modem cartridge so as to entrap a plastic spacer 54 which both supports and spaces the spring contacts. The plastic number 54 of course, is also supported in position by an appropriate hole in the cover 44 of the cartridge. Since the preferred embodiment modem is intended to connect to the telephone line rather than a telephone handset line only two contacts are required. If on the other hand, connection to the handset line were desired, four contacts rather than two could readily be provided. As may be seen in FIG. 8, the plastic member 54 extends slightly through the opening in the cover 44, with the base of the U-shaped spring members extending somewhat outward from the plastic member so as to have a significant spring deflection capability to make electrical contact with an appropriately positioned adjacent contact independent of reasonable variations in the spacing therebetween.

With respect to the packaging of a modem within the required cartridge size, it should be noted that Novation Inc., assignor of the present invention, currently manufactures frequency shift of the present invention, currently manufactures frequency shift keyed modems based upon two large scale integrated circuits which together with a minimal amount of required supporting circuitry may readily be packaged within the cartridge size to provide a modem in accordance with any of the popular frequency shift keyed modem standards, such as, by way of example, the Bell 103 modem. Accordingly, details of the modem circuit itself are part of the prior art and will not be disclosed and described in greater detail herein.

Figure 2:
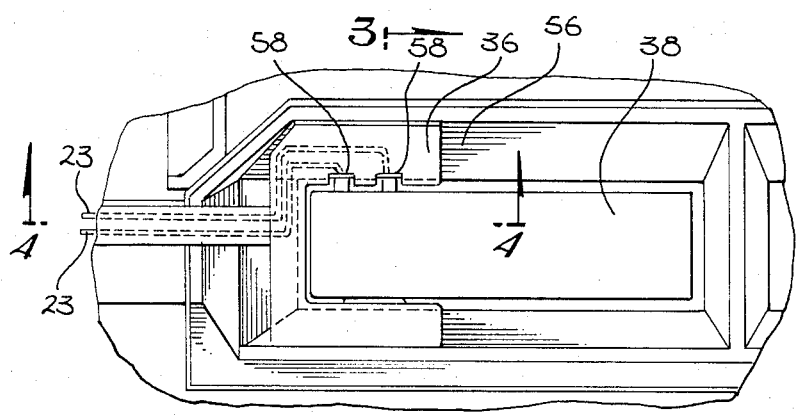
FIG. 2 is a top view of of one of the cartridge receptacles of the computer of FIG. 1 showing the present invention mounted therein.
Figure 3:
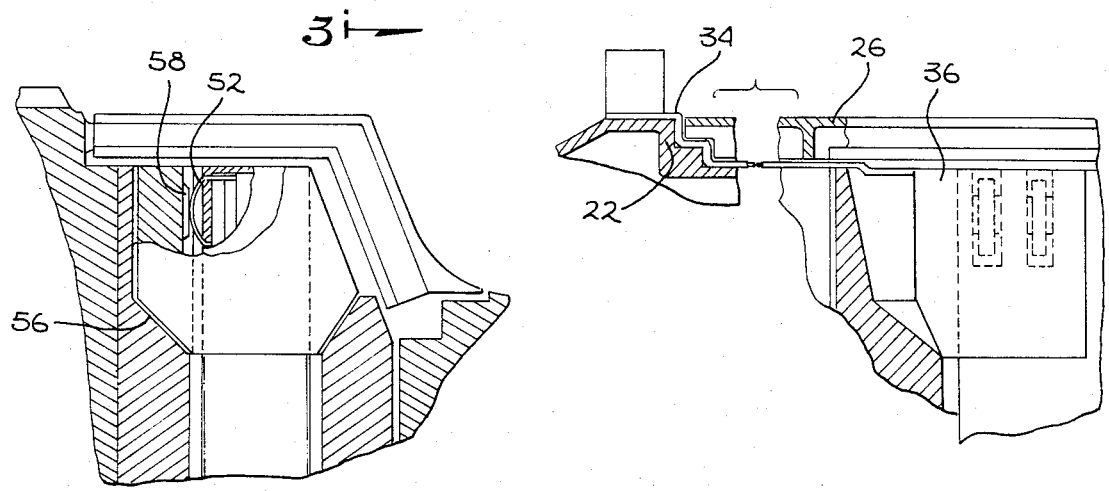
FIG. 3 is a partial cross section taken along line 3—3 of FIG. 2.

Now referring to FIGS. 2, 3, and 4, details of the C-shaped element 36 and related portions of the invention may be seen. The C-shaped member 36 is configured to mate with member 56 in the computer, preferably by self-stick adhesive, again protected by an appropriate peal strip prior to installation of the C-shaped member. Such adhesives are well-known in the prior art and are commonly used to provide a substantially permanent mounting of one object to another. In that regard, the C-shaped member 36 in the preferred embodiment will be a plastic member, with member 56 in the computer being a metal member, both being ideal surfaces for use of a self-stick adhesive. As may be seen in FIG. 2, the C-shaped member has an opening which is significantly wider than the thickness of a conventional program cartridge so that its permanent presence in the computer will not interfere in any way with the insertion of program cartridges of a conventional type. Also the contacts 58 in the C-shaped member are preferably slightly recessed so as to avoid wear on the contacts during use of the computer with conventional program cartridges. The spring contacts 52 however, extending somewhat outward on the modem cartridge, readily engage the contacts 58, providing a wiping action therewith to assure a clean metal to metal contact of appropriate pressure to assure a high quality reliable electrical contact.

Now referring to FIG. 9, a front view of an Atari 400 computer generally indicated by numeral 60 may be seen. This computer is a lower priced computer than the Atari 800, and has only a single receptacle 62 for program cartridges. The shape of the receptacle is essentially the same as each of the two receptacles 28 and 30 of the Atari 800 computer shown in FIG. 1, and accordingly either the same or a similar contact member 66 with associated cable 68 and modular connector 70 may be used to provide electrical contact to the modem cartridge 38. Of course, as an alternative, in those applications which will allow it, either as a result of sufficient clearance under the cartridge receptacle cover, no cover being used or when other special provision is made for the line, a cartridge 70 may be provided with a modular plug 72 directly thereon as shown in FIG. 10, so that a telephone line, or as an alternative or handset line, may be coupled directly thereto.

There has been disclosed and described herein a new and unique modem cartridge and associated connection means, to provide a modem function in program cartridge type computers utilizing program cartridge packaging and connection means to the computer itself. While the specific embodiments disclosed herein have been described with respect to direct connect modems whereby a modular connector is used to directly connect to the telephone line, the same principles and concepts of the invention may readily be applied to direct connect modems intended to connect to the handset line of a telephone, in which case the connectors 32 and 70 will be a smaller modular connector, or to connect to an acoustic coupler in which case the connectors 32 and 70 could be substantially any convenient connector to be used for the purpose. Of course in the case of connection to a telephone handset line or to an acoustic coupler, the cables 34 and 68 and related parts will be provided with four conductive strips or conductors rather than two. Obviously of course the present invention is not limited to use with Atari computers, but may also be used with computers of a similar type which may be manufactured by other companies. Thus while preferred embodiments of the present invention have been disclosed and described herein in detail, it will be understand by those skilled in the art that various changes in form and detail may be made therein without departing the spirit and scope of the invention.

I claim:

1. Modem apparatus for program cartridge type computers having at least one cartridge receptacle for receiving and electrically connecting to program cartridges, each of a predetermined mechanical and electrical connection configuration, comprising first contact means for fastening to said cartridge receptacle so as to be disposed adjacent to but not restrict the insertion and removal of a program cartridge of said predetermined mechanical configuration therein a modular phone connector coupled to said first contact means for coupling to a phone system a modem cartridge containing a modem, and having said predetermined electrical connection configuration and a mechanical configuration so as to be receivable in said cartridge receptacle to electrically connect said modem and said computer, said modem cartridge further having second contact means cooperatively disposed on said modem cartridge so as to make contact with said first contact means when said modem cartridge is inserted into said cartridge receptacle.

2. The modem apparatus of claim 1 wherein said modular phone connector is coupled to said first contact means through a cable.

3. The modem apparatus of claim 2 wherein said cable is a thin, flat cable, whereby said cable will not interfere with the closing of a cover over said cartridge receptacle.

4. The modem apparatus of claim 1 wherein the thickness of said modem cartridge over said second contact means is greater than program cartridges of said predetermined mechanical configuration.

5. The modem apparatus of claim 4 wherein said first contact means contains first contacts which are slightly recessed with respect to the body of said first contact means, whereby said first contacts will not be engaged during insertion and removal of program cartridges of said predetermined mechanical configuration.

6. The modem apparatus of claim 1 wherein said first contact means comprises an approximately C-shaped body disposed in said cartridge receptacle to span the thickness of said modem cartridge, so that opposite portions of said body are facingly disposed to opposite sides of a modem cartridge inserted into said receptacle, whereby said modem cartridge will be positioned by the cooperatively disposed body.

7. Modem apparatus for program cartridge type computers having at least one cartridge receptacle for receiving and electrically connecting to program cartridges, each of a predetermined mechanical and electrical connection configuration, comprising first contact body means for fastening to said cartridge receptacle so as to be disposed adjacent to but not restrict the insertion and removal of a program cartridge of said predetermined mechanical configuration therein, said first contact body means having at least a first pair of contact means therein a connector means for coupling to a phone system a cable for coupling said connector means and said first pair of contact means, and a modem cartridge containing a modem, and having said predetermined electrical connection configuration and a mechanical configuration so as to be receivable in said cartridge receptacle to electrically connect said modem and said computer, said modem cartridge further having second contact means cooperatively disposed on said modem cartridge so as to make contact with said first contact means when said modem cartridge is inserted into said cartridge receptacle.

8. The modem apparatus of claim 7 wherein said cable is a thin, flat cable, whereby said cable will not interfere with the closing of a cover over said cartridge receptacle.

9. The modem apparatus of claim 8 further comprised of adhesive means for securing said first contact body means, said connector means and said cable to the adjacent surfaces of a computer.

10. The modem apparatus of claim 8 wherein the thickness of said modem cartridge over said second contact means is greater than program cartridges of said predetermined mechanical configuration.

11. The modem apparatus of claim 10, wherein said first pair of contact means are slightly recessed with respect to said first contact body means, whereby said first pair of contact means will not be engaged during insertion and removal of program cartridges of said predetermined mechanical configuration.

12. Modem apparatus for program cartridge type computers having at least one cartridge receptacle for receiving and electrically connecting to program cartridges, each of a predetermined mechanical and electrical connection configuration, comprising a modem cartridge containing a modem, and having said predetermined electrical connection configuration and a mechanical configuration so as to be receivable in said cartridge receptacle to electrically connect said modem and said computer, said modem cartridge further having a modular connector cooperatively disposed on said modem cartridge so as to be connectable with a phone line when said modem cartridge is inserted into said cartridge receptacle.

* * * * *